(12) United States Patent
McCann

(10) Patent No.: US 8,320,003 B2
(45) Date of Patent: Nov. 27, 2012

(54) SYSTEMS AND METHODS FOR PRINTER CONFIGURATION MANAGEMENT

(75) Inventor: Tim McCann, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 682 days.

(21) Appl. No.: 12/481,507

(22) Filed: Jun. 9, 2009

(65) Prior Publication Data
US 2010/0309507 A1 Dec. 9, 2010

(51) Int. Cl.
*G06F 15/00* (2006.01)
*G06F 17/00* (2006.01)
(52) U.S. Cl. .................................. 358/1.15; 715/277
(58) Field of Classification Search .................. 358/1.15
See application file for complete search history.

(56) References Cited

U.S. PATENT DOCUMENTS

| 5,500,715 A * | 3/1996 | Ta et al. ............................ 399/1 |
| 6,349,304 B1 * | 2/2002 | Boldt et al. .......................... 1/1 |
| 7,554,684 B1 * | 6/2009 | Senoo et al. ................. 358/1.15 |

* cited by examiner

*Primary Examiner* — Saeid Ebrahimi Dehkordy
(74) *Attorney, Agent, or Firm* — Finnegan, Henderson, Farabow, Garrett & Dunner, L.L.P.

(57) ABSTRACT

Systems and methods consistent with disclosed embodiments provide a method for managing a printer configuration menu comprising a plurality of menu options, by associating a menu configuration change field with each menu options, assigning a value to the menu configuration change field, and displaying the menu option as part of printer configuration menu during printer configuration based on the value of the menu configuration change field associated with the at least one menu option.

20 Claims, 7 Drawing Sheets

SYSTEMS AND METHODS FOR PRINTER CONFIGURATION MANAGEMENT

BACKGROUND

1. Field of the Invention

The present invention relates to the field of printing, and in particular to systems and methods for facilitating the configuration of printers.

2. Description of Related Art

Computer printers, which are ubiquitous in most modern organizations, permit the quick printing of stored documents. Designers of modern printers have focused relentlessly on improving printer speed, throughput, features, efficiency, and cost resulting in virtually universal adoption of printers. The proliferation of printers has led to their deployment in a wide variety of information processing environments. Accordingly, in an attempt to allow users flexibility in customizing printers, printer manufacturers have provided users with a wide variety of configuration options. Typically, these options may be set or changed using an operator control panel coupled to the printer, or through a user interface displayed on a monitor coupled to a user's computer. In some instances, the user interface may be provided by a printer driver or a print controller coupled to the printer.

While the plethora of configuration options available on printers has facilitated printer deployment across a variety of environments, it has also contributed to an increase in the complexity of printer configuration for both manufacturers and end-users. For example, a manufacturer may have to deal with a large number of potentially different configuration menus for individual printer models. From the standpoint of an end user, the user may have to navigate through a maze of pull-down menus before being able to locate and change a specific configuration setting. Moreover, the increased flexibility afforded to users has come at the expense of decreased control exercised by system administrators over printer configuration. For example, a system administrator may not be able to prevent one or more users or user groups from altering a specific printer configuration, especially if the configuration setting is directly accessible using an operator control panel coupled to the printer. Therefore, there is a need for a simple, efficient, and easily deployable systems and methods that facilitate the configuration management of printers.

SUMMARY

In accordance with disclosed embodiments, apparatus, systems, and methods for the configuration management of printers are presented. In some embodiments, a method for managing a printer configuration menu comprising a plurality of menu options comprises: associating a menu configuration change field with at least one menu option; assigning a value to the menu configuration change field; and displaying the menu option as part of printer configuration menu during printer configuration based on the value of the menu configuration change field associated with the at least one menu option.

Embodiments of the present invention also relate to software, firmware, and program instructions created, stored, accessed, or modified by processors using computer-readable media or computer-readable memory. The methods described may be performed by systems, including a computer and/or a printing device. These and other embodiments are further explained below with respect to the following figures.

DETAILED DESCRIPTION

In accordance with the present invention, systems and methods for the configuration management of printers are presented.

Figure 1:
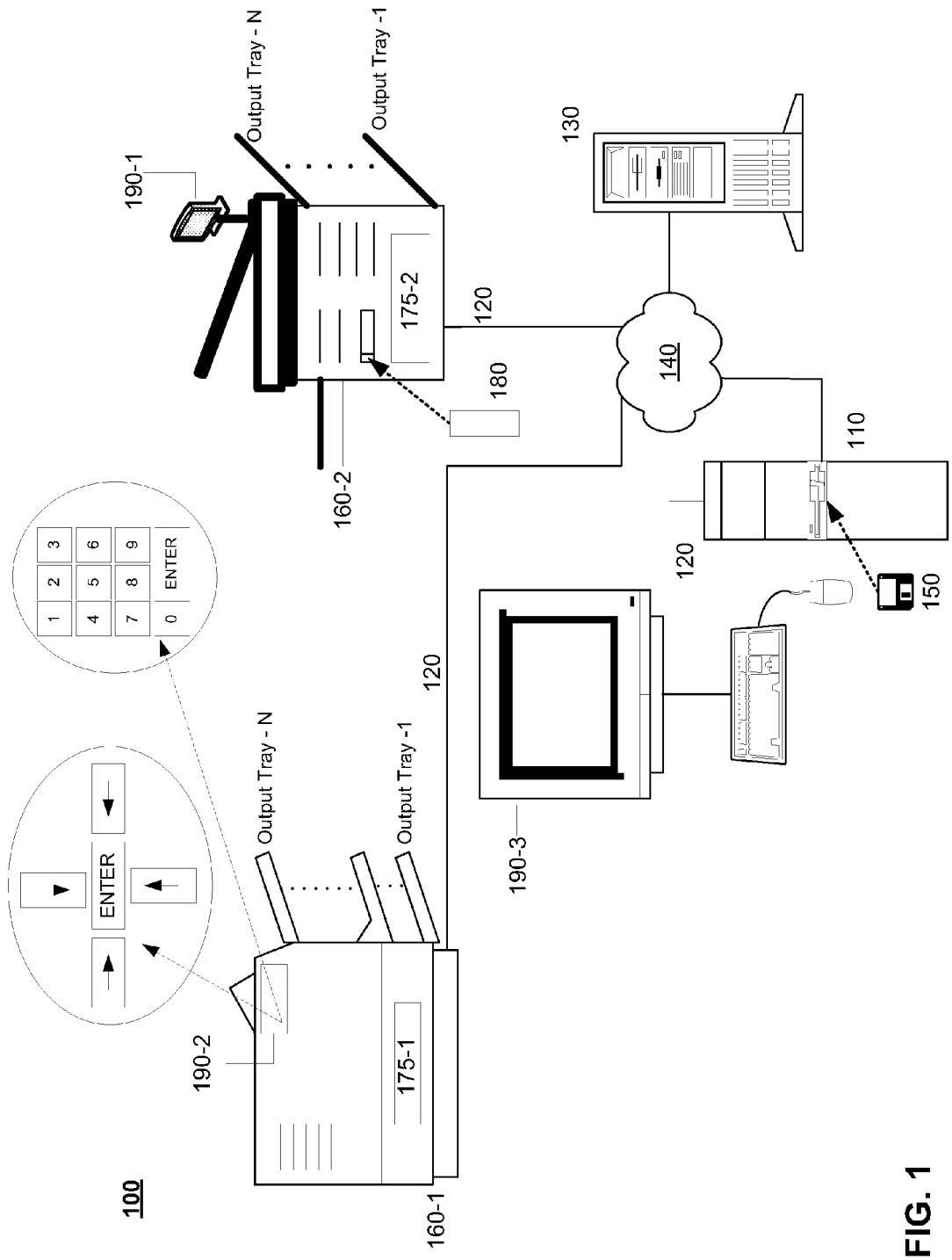
FIG. 1 shows a block diagram of exemplary system for the configuration management of printers.

FIG. 1 shows a block diagram of exemplary system 100 for the configuration management of printers. A computer software application may be deployed on a network of computers and/or printers, as shown in FIG. 1, that are connected through communication links that allow information to be exchanged using conventional communication protocols and/or data port interfaces.

As shown in FIG. 1, exemplary system 100 includes a computer or computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices too (not shown). Computing device 110, server 130, and printers 160 may be capable of executing software (not shown) that allows the configuration management of printers, such as printers 160-1 and 160-2.

Printers 160 may be laser printers, ink jet printers, LED printers, or any other device capable of placing marks on a print medium. From a functional perspective, printers 160 may take the form of plotters, multi-function devices, facsimile machines, digital copiers, and/or various other devices for printing documents. Computing device 110 may contain a removable media drive 150. Removable media drive 150 may include, for example, 3.5 inch floppy drives, CD-ROM drives, DVD ROM drives, CD±RW or DVD±RW drives, flash drives, memory cards, and/or any other removable media drives consistent with embodiments of the present invention. Portions of software applications may reside on removable media and be read and executed by computing device 110 using removable media drive 150. In some embodiments, intermediate and final results and/or data generated by applications may also be stored on removable media.

Connection 120 couples computing device 110, server 130, and printers 160 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as serial, parallel, USB™, SCSI, FIREWIRE™, and/or Ethernet ports for transmission of data through the appropriate connection 120. The communication links could be wireless links or wired links or any combination that allows communication between computing device 110, server 130, and printers 160.

Network 140 could include a Local Area Network (LAN), a Wide Area Network (WAN), or the Internet. Exemplary printing device 160-2, may be a network printer, and can be connected to network 140 through connection 120.

System 100 may include multiple printing devices 160 and other peripherals (not shown), according to embodiments of the invention. Printing devices 160 may be controlled by hardware, firmware, or software, or some combination thereof. Printing devices 160 may include one or more print controller boards 175, such as exemplary print controllers 175-1 and 175-2, which may control the operation of printing devices 160. Printing devices 160 may be controlled by firmware or software resident on memory devices in print controllers 175. In general, print controllers 175 may be internal or external to print devices 160. In some embodiments, printing devices 160 may also be controlled in part by software, including print servers, or other software, running on computing device 110 or server 120.

Printing devices, such as exemplary printing devices 160, may also include consoles 190 such as consoles 190-1 and 190-2, or other interfaces. In some embodiments, consoles 190 may take the form of an operator control panel ("OCP") coupled to a printer and allow users to manage the configuration of printers 160. In some embodiments, the OCPs may provide a keyboard, trackball, or a touch-screen interface to facilitate user input. In some embodiments, as shown in FIG. 1, console 190 in the form of OCP 190-2 may provide a basic interface to an operator. For example, up (↑) down (↓), right (→) and left (←) arrow keys may be provided along with an enter <ENTER> key to navigate, toggle, select, and set presented configuration options. In some embodiments, the OCP 190-2 may also (or alternatively) provide a numeric keypad to permit navigation, toggling, selection, and setting of configuration options.

In one embodiment, consoles 190-1 and 190-2 may accept user input and allow various configuration options for printers 160 to be set. For example, one or more menus may be provided to users to permit the selection and setting of individual configuration options. In some embodiments, the menus may be drop-down or pull-down menus, where the selection of one menu option may provide a list of additional configuration parameters associated with the selected menu option. In some embodiments, the user may be navigate through configuration using a sequence of configuration screens, where a selection on one configuration screen may bring up a subsequent configuration screen to permit further configuration. In general, the selection and setting of configuration parameters may be accomplished using a variety of user-interfaces and the disclosed methods may be modified appropriately based on the type of user-interface as would be apparent to one of ordinary skill in the art.

Consoles 190 may also be used to display a log-in screen to permit passwords and/or user identification and authentication information to be entered. In some embodiments, consoles 190 may take the form of a display or a monitor for a computer coupled to printing devices 160. For example, configuration options for printer 160 may be displayed using a virtual operator control panel using an appropriate graphical user interface ("GUI") on monitor 190-3, which is coupled to computer 110. In some embodiments, configuration management for printers 160 may be performed using software running on server 130 and displayed on console 190-3.

In some embodiments, user-configurable configuration parameters, which may be presented as configuration options in a printer configuration menu, may include one or more of user-interface configuration, security settings, print resolution, media size, color options, media type, duplex settings, print modes, input and output tray selection, output collation and stapling options, and various other configuration parameters. User interface configuration may permit configuration of the user-interface for printers 160 displayed on consoles 190. Print mode may allow the user to select a draft mode, ink saving mode and various other modes that may be provided by a manufacturer. A user may also be able to specify the use of automatic document feeders with input trays to allow batch processing of documents.

A computer software application consistent with the present invention may be deployed on any of the exemplary computers, or printers as shown in FIG. 1. For example, computing device 110 could execute software that may permit configuration management of printer 160-1. An independent application may also execute concurrently on printer 160-2 to permit its configuration. In another example, a configuration management application may operate to change configuration settings on printer 160-1 but could reside and execute on print controller 175-1. In general, applications may execute in whole or in part on one or more computers, print controllers, or printers in the system. The embodiments described above are exemplary only and other embodiments and implementations will be apparent to one of reasonable skill in the art.

Figure 2:
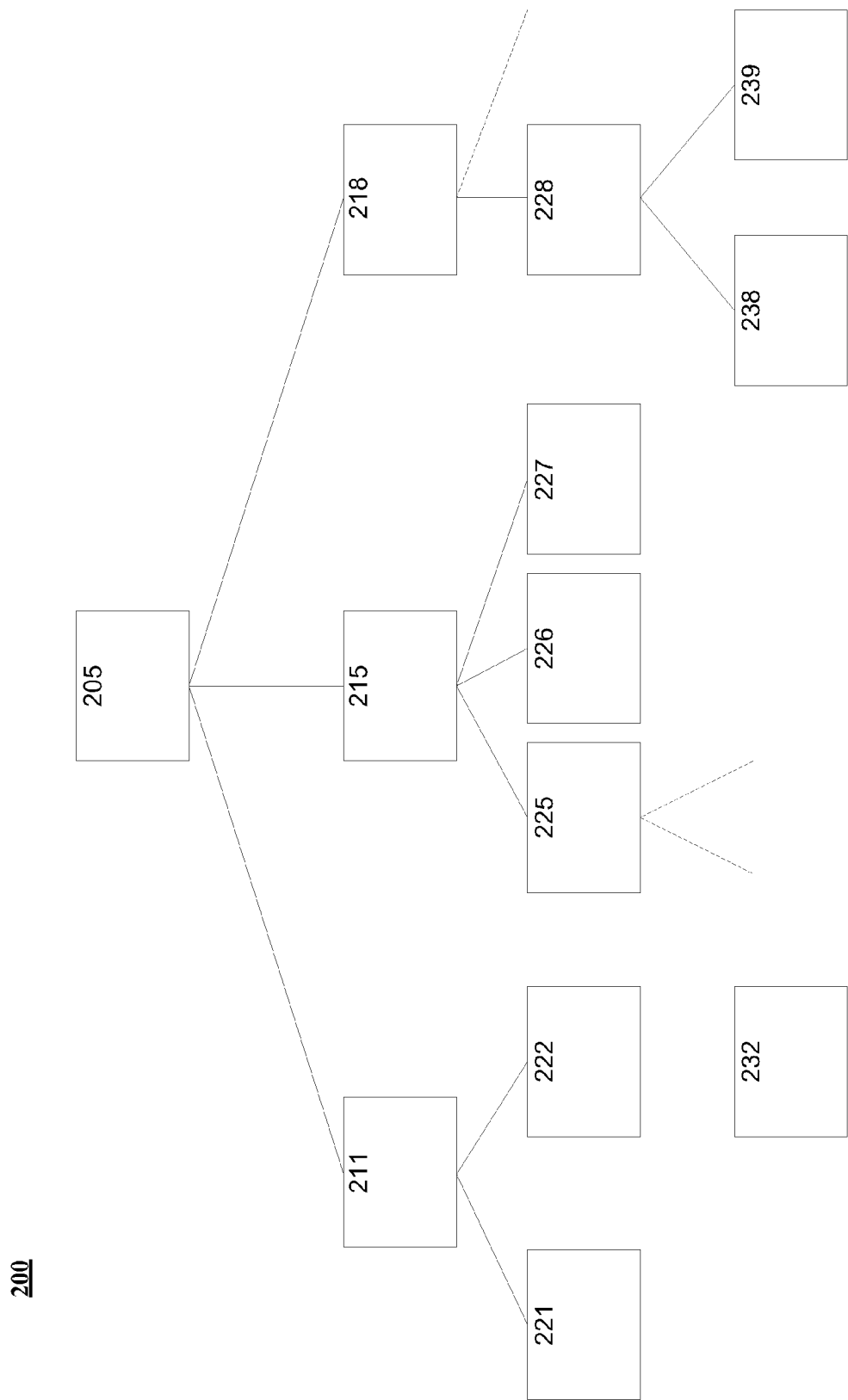
FIG. 2 illustrates a portion of a conventional menu hierarchy showing menu objects used to configure a printer menu that is displayed to user during printer configuration.

FIG. 2 illustrates a portion of a conventional menu hierarchy 200 showing menu objects used to configure a printer menu that is displayed to user during printer configuration. As shown in FIG. 2, menu hierarchy 200 includes one or more menu objects, which can be used by a configuration management program to present users with configuration options in a configuration menu for printers 160.

Menu objects, which may be held in a data structure, may be used to display choices that are presented to a user at various points during the configuration of printers 160. For example, exemplary menu object 205 may correspond to the main menu and provide an initial set of menu options. Menu objects, such as exemplary menu object 205, may include one or more data fields and/or other objects including: choices or menu selections to be displayed to the user; identification information for menu objects associated with each selection option displayed to the user such as exemplary child menu objects 211, 215, and 218; the current value of any configuration parameters associated with menu object 205; the acceptable ranges or values for any configuration parameters associated with menu object 205; identification information for any parent menu objects; and/or values of any configuration parameters associated with child menu objects such as values associated with exemplary menu objects 211, 215, and 218.

As shown in FIG. 2, menu hierarchy 200 may include a top level or root menu object 205, which may be configured to permit a printer configuration management program to provide the user with an initial set of selections, where each selection presented to the user may be associated with a corresponding child menu object such as one of menu objects 211, 215, or 218. Accordingly, when a user chooses one of the options presented, the printer configuration management program may use the menu object associated with the selection to determine the next set of configuration options to be presented to the user.

As shown in FIG. 2, in menu hierarchy 200, child menu objects 221 and 222 descend from parent menu object 211.

Similarly, child menu objects 225, 226, and 227 descend from parent menu object 215, while child menu object 228 descends from parent menu object 218. Further, menu object 222 is associated with lower level menu object 232, while menu object 228 is associated with lower level menu objects 238 and 239. Menu hierarchy 200 may also include other menu objects (not shown) as indicated by the dotted lines. In conventional systems, a printer configuration management program can use the menu objects in a data structure configured to represent the menu hierarchy to display configuration options and to alter configuration settings of printers 160 based on user input during the printer configuration process.

If menu hierarchy is presented to a user using up (↑) and down (↓) keys for navigation, right (→) and left (←) arrow keys for toggling between options presented with the enter <ENTER> key to select a configuration option, then selection of a menu option (by using the <ENTER> key) corresponding to menu object 205 may lead to the display of menu options corresponding to menu objects 211, 215, or 218. If the menu option corresponding to menu object 211 was selected then, the user may toggle between the options corresponding to menu object 211 using the right (→) and left (←) arrow keys. Similarly, selection of a menu option corresponding to menu object 211 (by using the <ENTER> key) may lead to the display of menu options corresponding to menu objects 221 or 222. In general, the use of <ENTER> selects the displayed option while the use of the right (→) and left (←) arrow keys toggles between the options available for a menu object. In some embodiments, the up (↑) and down (↓) keys may be used for navigating the menu hierarchy to browse configuration settings without changing the current settings.

If a numeric keypad is provided, the operator may be provided with a unique numeric identifier for each presented menu option corresponding to a menu object. The operator may then select one of the options by depressing the appropriate numeric key on the numeric keypad associated with the OCP. As can be seen, in the conventional systems described above, configuring the printer may be a cumbersome process that can involve the use of several keys repeatedly. The burden of the printer configuration process may be significantly compounded if the conventional system provides only a basic interface (such as arrow keys and/or numeric keypad) for the operator control panel.

Figure 3:
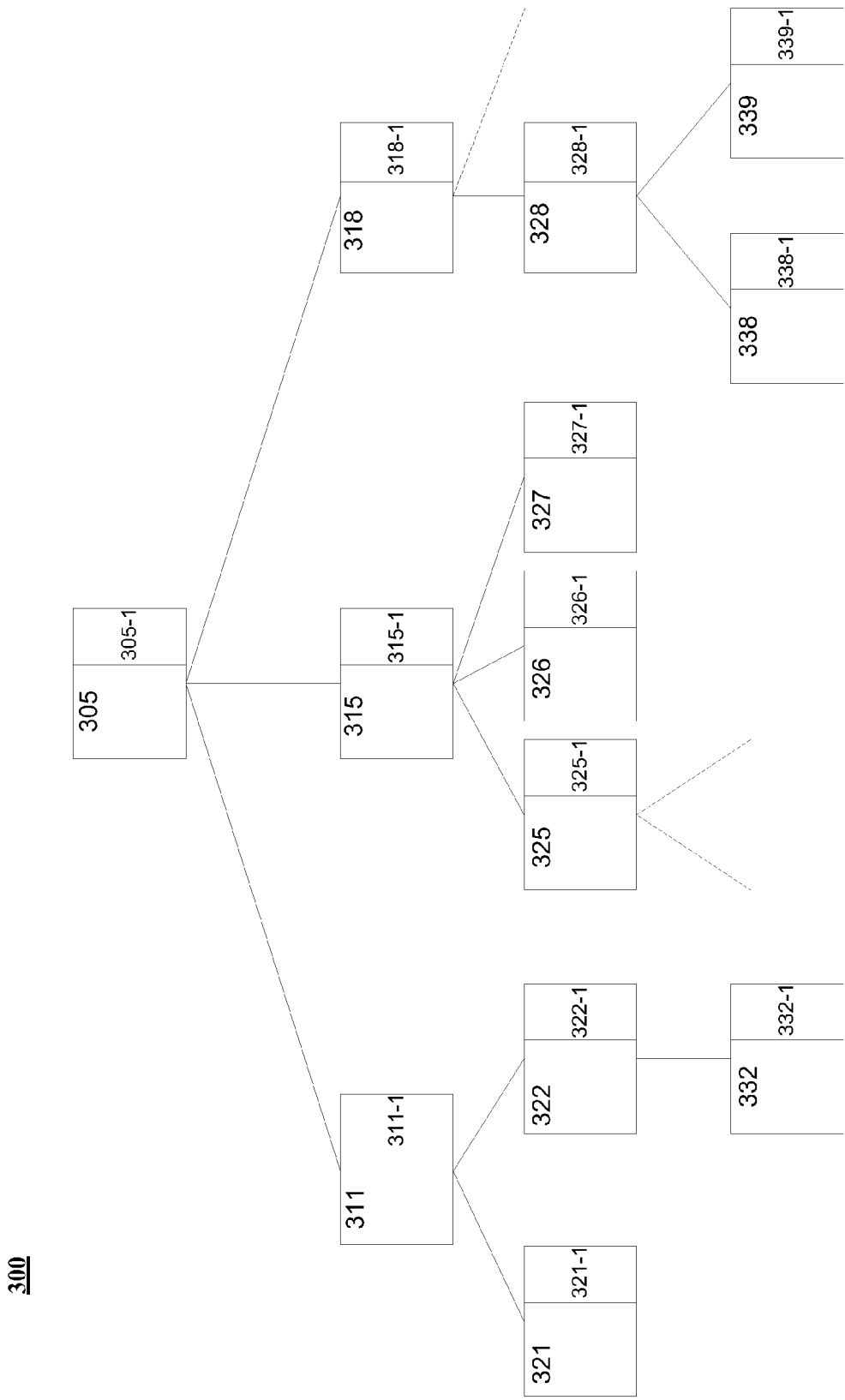
FIG. 3 illustrates a portion of an exemplary menu hierarchy showing menu objects used to configure a menu displayed to user during a printer configuration process consistent with disclosed embodiments.

FIG. 3 illustrates a portion of an exemplary menu hierarchy 300 showing menu objects used to configure a menu displayed to user during a printer configuration process consistent with disclosed embodiments. For ease of description, menu hierarchy 300, as shown in FIG. 3, is structurally identical to exemplary menu hierarchy 200 shown in FIG. 2. As shown in FIG. 3, each exemplary menu object 3XY in menu hierarchy 300 also includes an associated menu configuration change field or menu configuration change object 3XY-1, where X and Y are digits in the identifier for the menu object. For example, menu object 305 (for which X=0 and Y=5) includes associated configuration change field 305-1. Similarly, lower level objects 311, 315, and 318 include associated menu configuration change fields 311-1, 315-1, and 318-1, respectively. FIG. 3 also shows lower level menu objects 321, 322, 325, 326, 327, 328, 332, 338, and 339 along with their respective associated menu configuration change fields 321-1, 322-1, 325-1, 326-1, 327-1, 328-1, 332-1, 338-1, and 339-1.

In some embodiments, a portion of menu configuration change field 3XY-1 (or another field) associated with object 3XY may be used to determine if object 3XY and any associated configuration parameters are accessible to end-users. For example, a printer manufacturer may be able to use a master menu hierarchy, which can take the form of menu hierarchy 300, to configure the user-interfaces for individual printers across a printer family. In one embodiment, appropriate bits may be set in the menu configuration field 3XY-1 associated with object 3XY to determine which menu items are displayed to end-users. For example, access to a menu object corresponding to duplex mode and its associated configuration option may be disabled for all end-users in a printer that does not support duplex mode printing. Accordingly, in this embodiment, the configuration menu will not display a duplex configuration option to end-users.

In some embodiments, some portion of menu configuration change field 3XY-1 associated with object 3XY in the menu hierarchy available to the end-user may also be used to determine if further changes are permitted to menu configuration options associated with object 3XY when the printer is being configured by end-users. For example, an end user, such as a system administrator, may permit the configuration of some parameters but may wish to disable changes to other printer configuration settings. Accordingly, in the example above, the system administrator may further configure the menu hierarchy enabled on exemplary printer 160 to further restrict access to and/or the readability of one or more configuration menu options.

In one implementation, the value of configuration change field 3XY-1 associated with object 3XY may be set to either 0 or 1. In this implementation a value "0" for configuration change field 311-1 may indicate that no changes are permitted to configuration settings associated with object 311 and its descendants, whereas a value "1" for field 311-1 may indicate that changes are permitted to configuration settings associated with object 311. Further, in this implementation, when the configuration change field 3XY-1 associated with object 3XY has the value 1, changes may be permitted to the configuration parameters associated with menu object 3XY. However, changes to configuration parameters associated with children or descendants of object 3XY will depend on the value of their respective individual configuration change fields. In general, while the enabling of configuration changes for a menu object 3XY is local to object 3XY, a disabling of configuration changes for a menu object 3XY will also disable configuration changes to menu objects descended from menu object 3XY.

For example, in the implementation above, a manufacturer may disable menu option associated with menu object 327 when configuring the user-interface for printer 160-2 by setting appropriate bits in menu configuration change field 327-1 to "0". Consequently, menu options associated with menu object 327 will not be displayed on printer 160-2. For example, menu object 327 may correspond to a duplex printing mode, which may not be available on printer 160-2. Subsequently, a system administrator may further configure the configuration menu on printer 160-2 by setting appropriate bits in menu configuration change field 328-1 to "0" thereby preventing users for accessing and/or reading configuration options associated with menu object 328. For example, menu object 328 may be associated a particular high resolution print mode that the system administrator may wish to disable.

Note that, in some embodiments, if the value of menu configuration change field 311-1 is set to 0, then configuration changes may be disabled for menu options associated with lower level menu objects 321, 322, and 332. However, if the value of menu configuration change field 311-1 is set to 1, then configuration changes are permitted for menu options associated with menu object 311, but the values of fields 321-1 and 322-1 will determine if changes are permitted to configuration parameters associated with menu objects 321 and 322, respectively.

Figure 4:
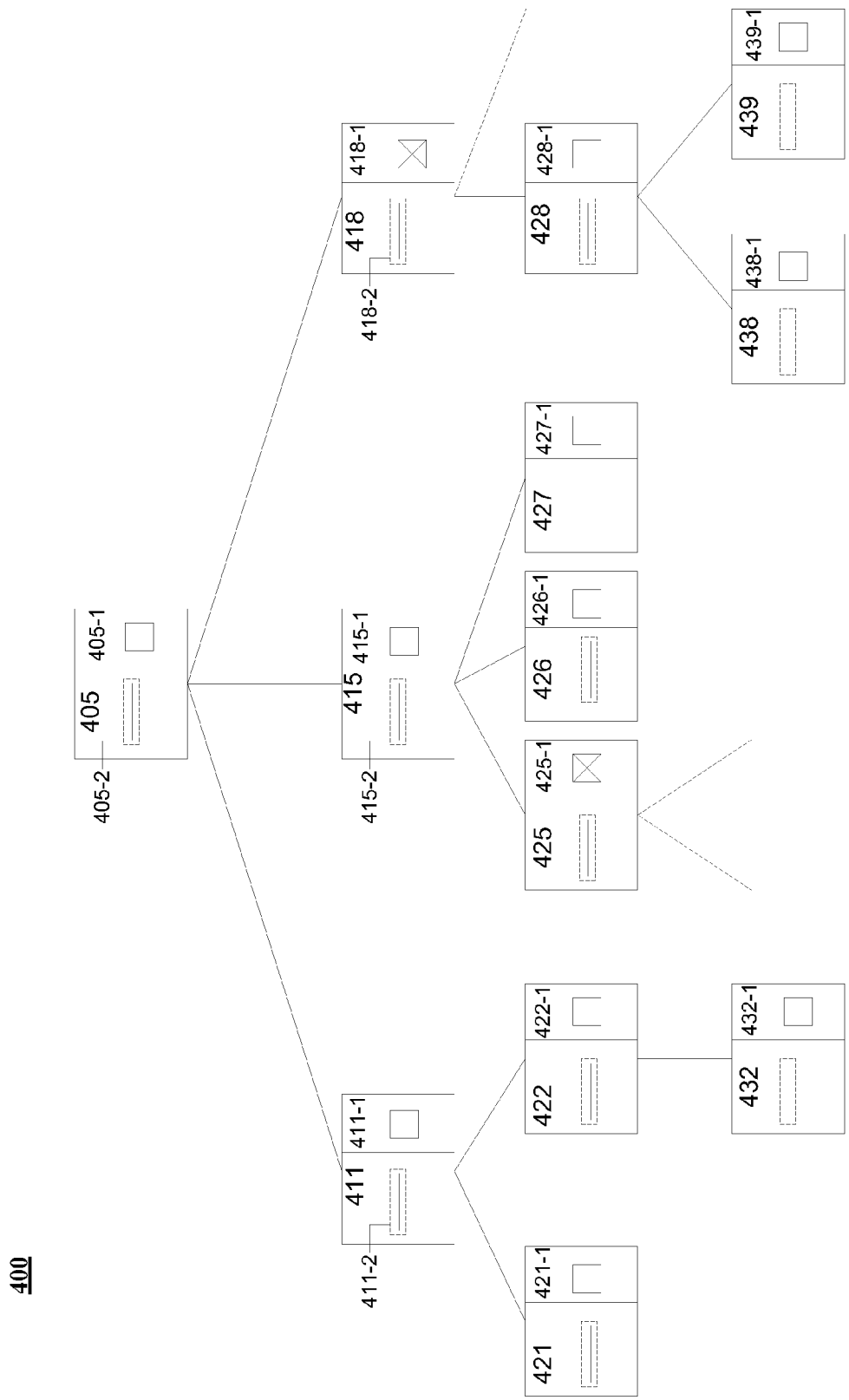
FIG. 4 shows an exemplary user-interface 400 to permit users to configure menus using the exemplary menu hierarchy of FIG. 3.

FIG. 4 shows an exemplary user-interface 400 to permit users to configure menus using exemplary menu hierarchy 300 for printers 160. In some embodiments, exemplary user-interface 400 may be displayed on consoles 190, which, in some instances, may be an OCP. Exemplary user-interface 400 may be provided by a configuration management program running on one or more of computer 110, printers 160, server 130, or print controllers 175 to permit configuration management of printers 160. In some embodiments, exemplary user-interface 400 may be used to configure menus during normal printer operation. It should be noted that user-interface 400 shown is exemplary only and various other interfaces may be used as would be apparent to one of ordinary skill in the art.

As shown in FIG. 4, exemplary user-interface 400 may display the hierarchy of menu options using icons 4XY with a message 4XY-2 describing the menu option and a check-box 4XY-1 indicating whether the display of the menu option should be inhibited. For example, top-level menu option icon 405 (for which X=0 and Y=5) may be displayed with message 405-1, which may be a string such as "Main Configuration Menu" and check-box 405-1. As shown in FIG. 4, the next level of menu option icons 411, 415, and 418 may also be presented along with messages 411-2, 415-2, and 418-2, as well as check boxes 411-1, 415-1, and 418-2, respectively. FIG. 4 also shows lower level menu option icons 421, 422, 425, 426, 427, 428, 432, 438, and 439 along with their respective associated messages 421-2, 422-2, 425-2, 426-2, 427-2, 428-2, 432-2, 438-2, and 439-2, and their respective associated check-boxes 421-1, 422-1, 425-1, 426-1, 427-1, 428-1, 432-1, 438-1, and 439-1.

If the user checks a box associated with a menu option icon, then, in the embodiment shown in FIG. 4, that option and any lower level menu options may not be displayed to a user during configuration process for a printer thereby preventing configuration settings associated with those options from being changed. For example, in FIG. 4, check-box 418-1 associated with menu option icon 418 has been checked. Therefore, menu options associated with icons 428, 438, 429 and any other lower level menu option icons will be disabled when a configuration menu for the printer being configured is displayed to the user. Similarly, check-box 425-1 associated with menu option icon 425 has been checked. Therefore, menu options associated with icon 425 and any lower level menu option icons will be disabled. In some embodiments, when the user checks or un-checks check box 4XY-2 then the value of menu configuration change field 3XY-1 in menu object 3XY may be changed to reflect the new configuration. For example, checking check box 418-1 may change the value of menu configuration change field 318-1 associated with menu object 318 to "0".

Figure 5:
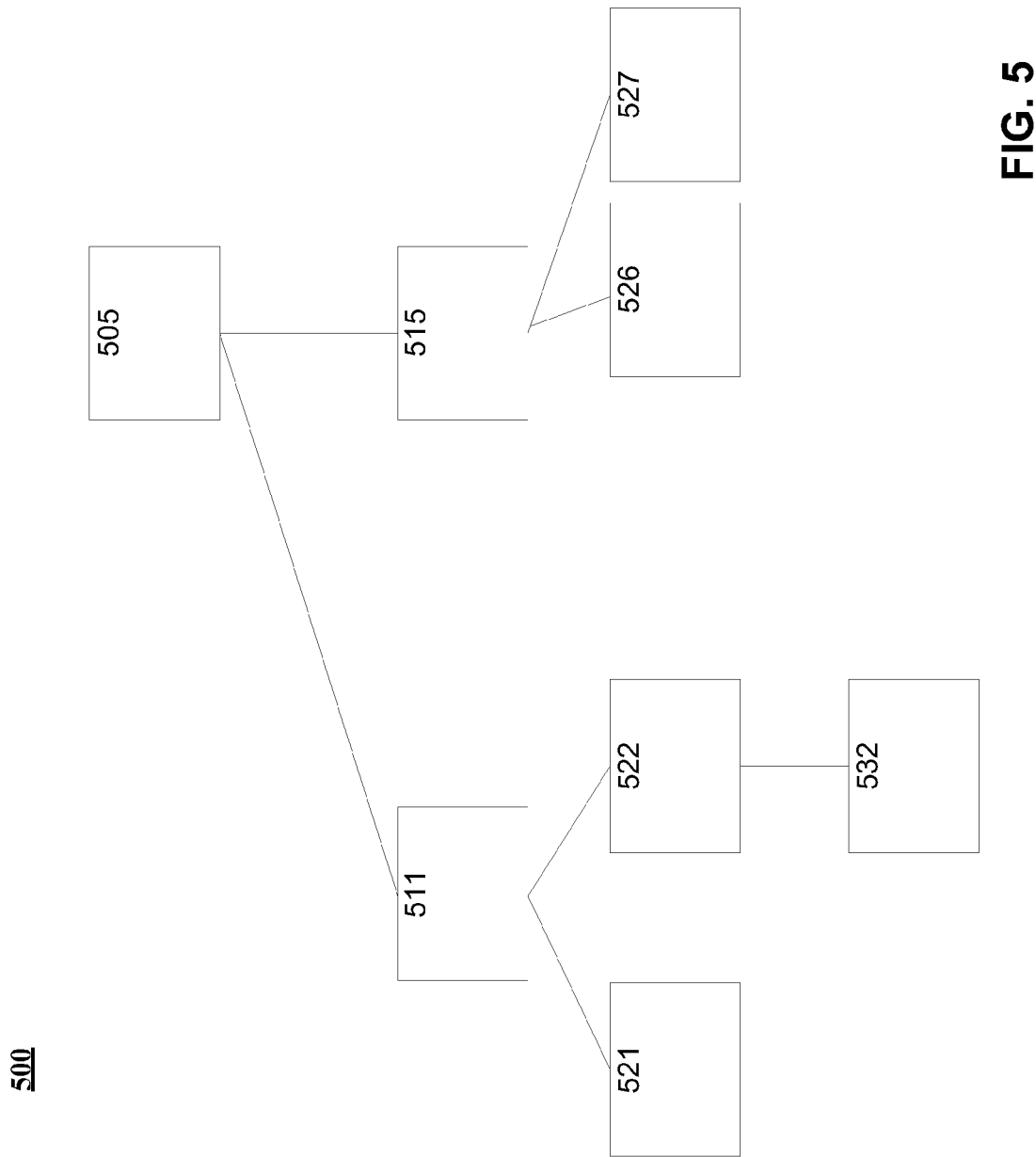
FIG. 5 shows the effective configuration menu hierarchy 500 resulting from user selections shown in FIG. 4.

FIG. 5 shows the effective configuration menu hierarchy 500 resulting from user selections shown in FIG. 4. Effective menu hierarchy 500 may result from the implementation of the exemplary user check box selections shown in user interface 400. In some embodiments, when the display of menu option 5XY in a configuration menu for printer 160 may depend on whether a user has checked corresponding check box 4XY-1 associated with the menu option icon 4XY, or for any of its ancestors in the user interface 400. As discussed earlier, in some embodiments, any user selections made using user interface 400 may be reflected in configuration change field 3XY-1, which may be used by a configuration management program to determine the configuration menu choices to be presented to a user.

For example, as shown In FIG. 4, check boxes 418-1 and 425-1 for menu option icons 418 and 425 have been checked. Accordingly, menu options corresponding to menu option icons 418 and 425 and menu options associated with icons for their descendants have been disabled and are not available in the configuration menu shown to the user. Therefore, as shown in FIG. 5, effective menu hierarchy shows two child menu options 511 and 515 for top level menu option 505, while menu option 515 shows two child menu options 526 and 527. Menu option 511 continues to have menu options for its descendants 521, 522, and 532.

Figure 6:
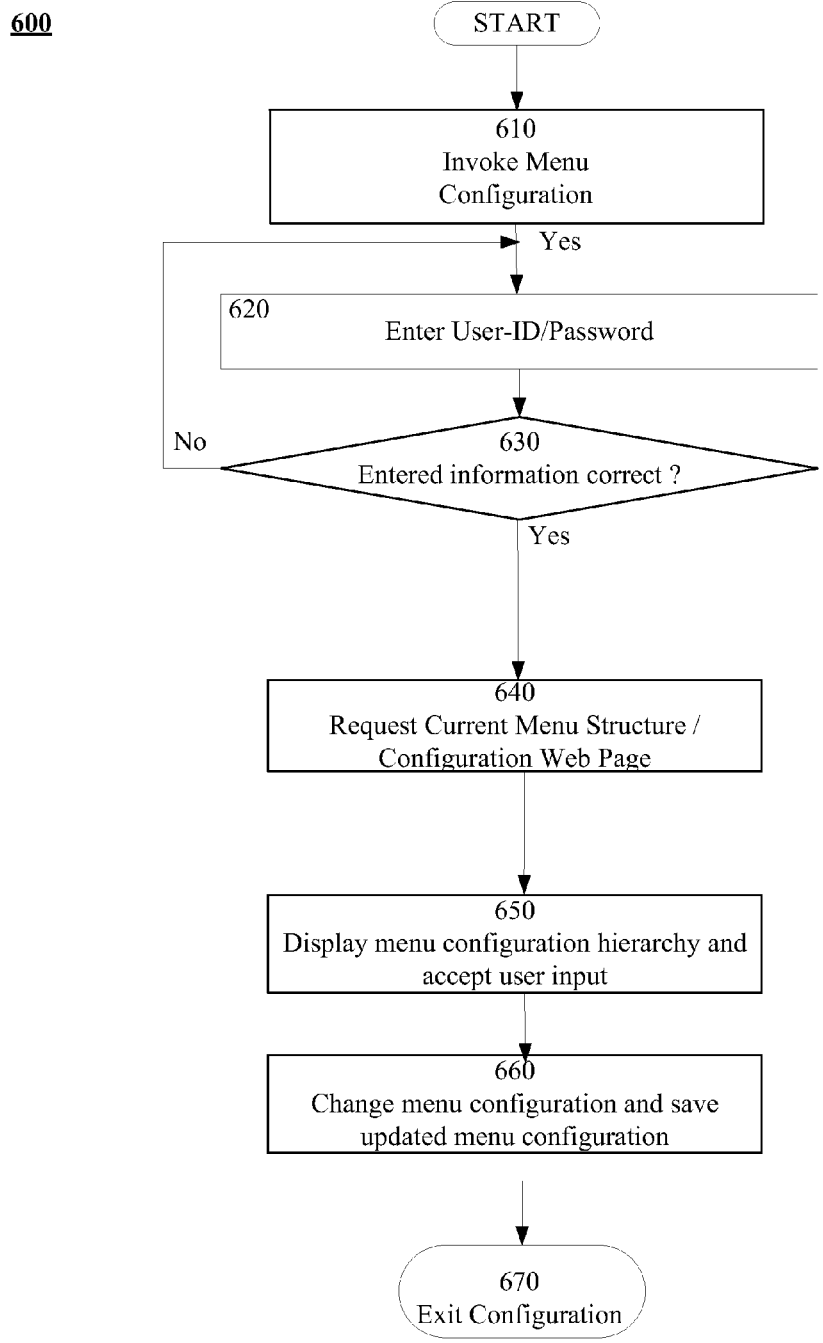
FIG. 6 shows an exemplary flowchart for an algorithm 600 to manage printer menu configuration.

FIG. 6 shows an exemplary flowchart for an algorithm 600 to manage printer menu configuration. In some embodiments, algorithm 600 may be implemented by one or more of computer 110, printers 160, server 130, or print controllers 175. In some embodiments, a user may invoke configuration management algorithm in step 610. In some embodiments, invoking of configuration management may result in a log-in screen being presented to the user who may be asked to input a user-id and password in step 620. For example, the user-id and password information may be requested by print controllers 175 to ensure that the user is authorized to make changes to the configuration menu for printer 160.

The entered information may be verified in step 630. For example, print controller 175 may verify the information by using a local database or by requesting information from server 130 using network 140. If the entered information is correct the algorithm can proceed to step 640. If the entered information is incorrect, the user may be asked to repeat the process. In some embodiments, repeated log-in failures may result in suspension of the configuration process and/or a notification to the system administrator or security personnel.

In step 640, the current menu configuration structure or web page may be requested. In some embodiments, the current menu configuration structure may be obtained from printer 160 or print controller 175 and served and displayed as a web page. Next, in step 650, the menu configuration hierarchy may be displayed to the user to permit the user to make changes to the menu configuration. For example, the menu hierarchy may be displayed using user interface 400 and a user may check or un-check check boxes 4XY-1 to change the existing menu configuration. Once the user has completed making changes the updated menu configuration may be stored in step 660. In some embodiments, the configuration settings and/or changes may be stored in non-volatile memory or other storage coupled to printer 160. The algorithm may then exit the menu configuration process in step 670.

Figure 7:
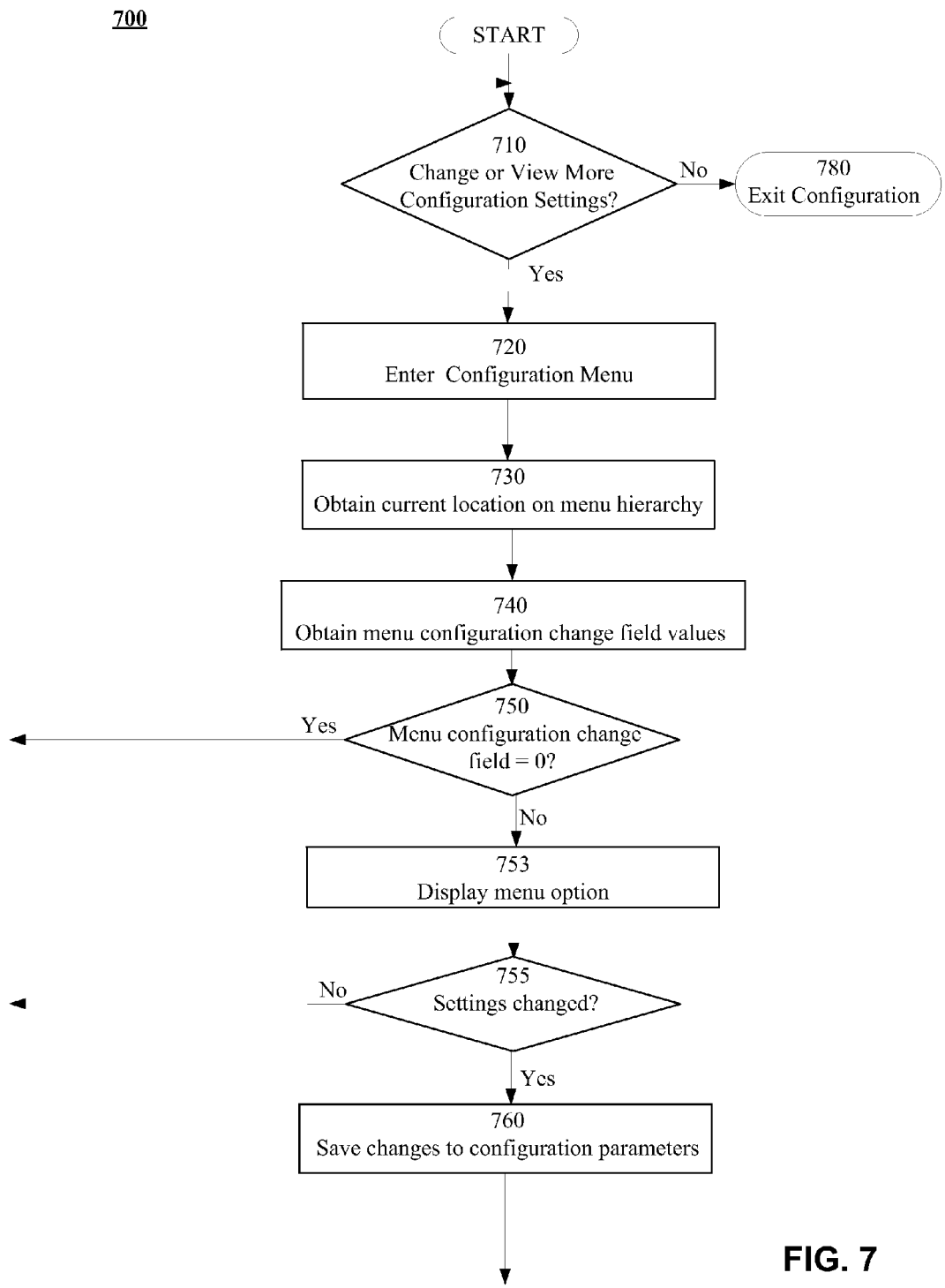
FIG. 7 shows an exemplary flowchart for an algorithm 700 for printer configuration consistent with disclosed embodiments.

FIG. 7 shows an exemplary flowchart for an algorithm 700 for printer configuration consistent with disclosed embodiments. Exemplary algorithm 700 may be invoked during the configuration of printer 160. In some embodiments, algorithm 700 may commence and in step 710, the user may be asked whether the user desires to view or change the first (or additional) configuration settings.

If the viewing or changing of configuration settings on printer 160 is requested, then in step 720, the algorithm may proceed to enter the configuration menu. Next, in step 730, the algorithm may obtain or determine the location of the menu object associated with the currently displayed menu screen in the menu hierarchy. In step 740, the algorithm may obtain the value of menu configuration change field 3XY-1 associated with the current menu option. In step 750, the value of menu configuration change field 3XY-1 may be checked. If menu configuration change field 3XY-1 is not "0" ("No" in step 750) then, in step 753, the menu option may be displayed. If menu configuration change field 3XY-1 is "0" ("Yes" in step 750), then the algorithm returns to step 710 to begin another iteration. For example, if menu configuration change field 305-1 is set to 0, then the user may be disabled from viewing or changing any configuration settings on the printer.

In step 755, the algorithm checks whether the user has made changes to the menu options presented. If the user has made changes ("Yes" in step 755), then, in step 760, changes to the configuration parameters associated with the menu option are saved and the algorithm then returns to step 710 to begin another iteration. If the user has not made any changes ("No" in step 755), then the algorithm then returns to step 710 to begin another iteration. In step 710, if the user elects not to change or view additional configuration settings ("No" in step 710), then the algorithm terminates in step 780.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that are most useful for that user's needs and purposes.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware.

Embodiments of the present invention also relate to compute-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A processor-implemented method for managing a printer configuration menu comprising a plurality of menu options arranged in a hierarchal manner with at least two or more levels of hierarchal dependencies, the method comprising:
    associating at least one menu configuration change field with a respective menu option;
    assigning a value to the menu configuration change field, the value comprising a first value if the menu configuration option associated with the menu configuration change field is to be displayed or a second value, different from the first value, if the menu configuration option associated with the menu configuration change field is not to be displayed ;
    displaying the respective menu option as part of printer configuration menu during printer configuration, if the menu configuration change field associated with the menu option has a first value; and
    not displaying the respective menu option and the respective menu option's hierarchal dependent menu options, if the menu configuration change field associated with the menu option has the second value.

2. The method of claim 1, wherein the configuration menu is displayed on an operator control panel coupled to the printer.

3. The method of claim 1, wherein the configuration menu is displayed on a monitor coupled to the printer.

4. The method of claim 1, wherein the value of the menu configuration change field may be changed during the operation of the printer.

5. The method of claim 1, wherein the method is performed on at least one of
    a printer;
    a print controller coupled to a printer; or
    a computer coupled to a printer.

6. The method of claim 1, further comprising storing the values assigned to the menu configuration change field in non-volatile memory on the printer.

7. The method of claim 1, wherein the method is performed by a printer manufacturer.

8. The method of claim 1, wherein the method is performed by an end user.

9. The method of claim 1, further comprising permitting changes to the menu options displayed as part of printer configuration menu.

10. A non-transitory computer-readable medium that stores instructions, which when executed by a processor perform steps in a method for managing a printer configuration menu comprising a plurality of menu options arranged in a hierarchal manner with at least two or more levels of hierarchal dependencies, the method comprising:
    associating at least one menu configuration change field with a respective menu option;
    assigning a value to the menu configuration change field, the value comprising a first value if the menu configuration option associated with the menu configuration change field is to be displayed or a second value, different from the first value, if the menu configuration option associated with the menu configuration change field is not to be displayed; and
    displaying the respective menu option as part of printer configuration menu during printer configuration, if the menu configuration change field associated with the menu option has a first value; and
    not displaying the respective menu option and the respective menu option's hierarchal dependent menu options, if the menu configuration change field associated with the menu option has the second value.

11. The non-transitory computer readable medium of claim 10, wherein the configuration menu is displayed on an operator control panel coupled to the printer.

12. The non-transitory computer readable medium of claim 10, wherein the configuration menu is displayed on a monitor coupled to the printer.

13. The non-transitory computer readable medium of claim 10, wherein the value of the menu configuration change field may be changed during the operation of the printer.

14. The non-transitory computer readable medium of claim 10, wherein the method is performed on at least one of
   a printer;
   a printer controller coupled to a printer; or
   a computer coupled to a printer.

15. The non-transitory computer readable medium of claim 10, further comprising storing the values assigned to the menu configuration change field in non-volatile memory on the printer.

16. The method of claim 10, wherein the method is performed by a printer manufacturer.

17. The method of claim 10, wherein the method is performed by an end user.

18. The method of claim 10, further comprising permitting changes to the menu options displayed as part of printer configuration menu.

19. A non-transitory computer-readable memory that stores instructions, which when executed by a processor perform steps in a method for managing a printer configuration menu comprising a plurality of menu options arranged in a hierarchal manner with at least two or more levels of hierarchal dependencies, the method comprising:
   associating at least one menu configuration change field with a respective menu option;
   assigning a value to the menu configuration change field, the value comprising a first value if the menu configuration option associated with the menu configuration change field is to be displayed or a second value, different from the first value, if the menu configuration option associated with the menu configuration change field is not to be displayed; and
   displaying the respective menu option as part of printer configuration menu during printer configuration, if the menu configuration change field associated with the menu option has a first value; and
   not displaying the respective menu option and the respective menu option's hierarchal dependent menu options, if the menu configuration change field associated with the menu option has the second value.

20. The non-transitory computer readable memory of claim 19, wherein the configuration menu is displayed on an operator control panel coupled to the printer.

* * * * *